Aug. 21, 1956 G. R. USSERY ET AL 2,759,632
DISPENSING MACHINE
Filed July 12, 1951 3 Sheets-Sheet 1

George R. Ussery
Mary J. Ussery
INVENTORS

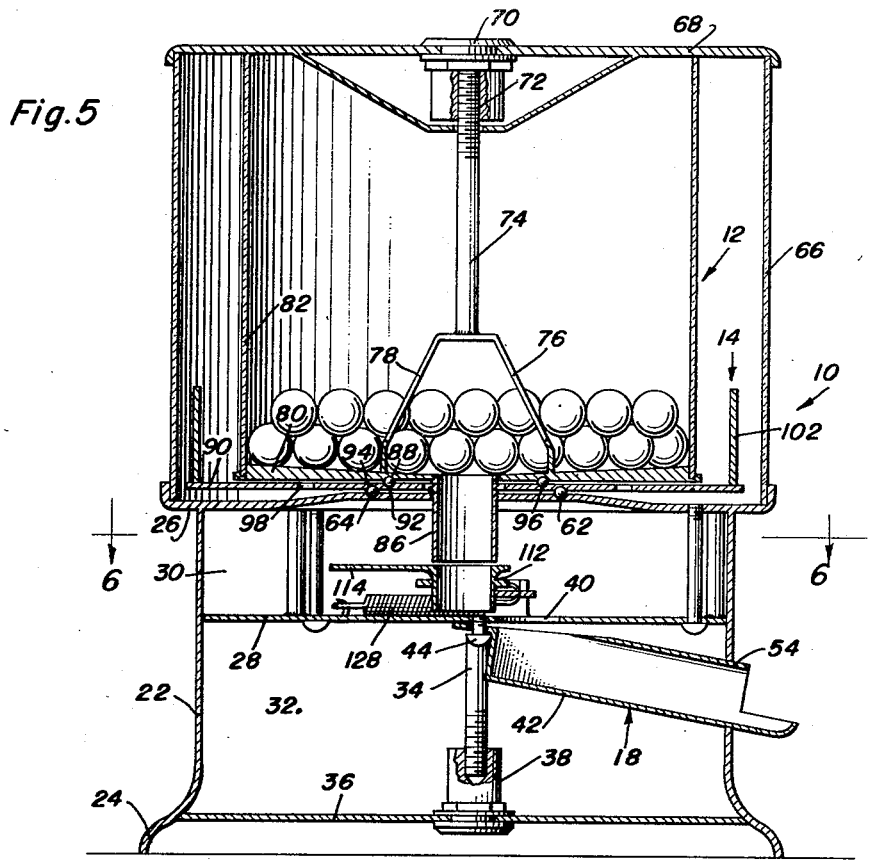
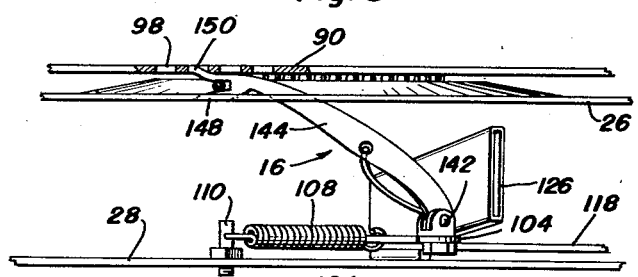
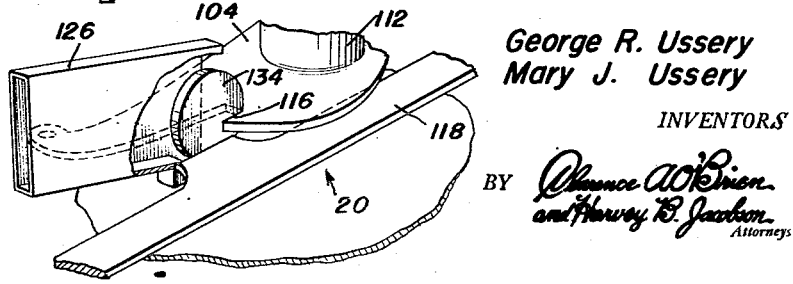

Aug. 21, 1956 G. R. USSERY ET AL 2,759,632
DISPENSING MACHINE

Filed July 12, 1951 3 Sheets-Sheet 3

George R. Ussery
Mary J. Ussery
INVENTORS

United States Patent Office 2,759,632
Patented Aug. 21, 1956

2,759,632
DISPENSING MACHINE

George R. Ussery and Mary J. Ussery, Hutchinson, Kans.

Application July 12, 1951, Serial No. 236,436

4 Claims. (Cl. 221—199)

The present invention relates to improvements in dispensing machines and more particularly to a dispensing machine of the type adapted to dispense gum balls or the like and wherein means are provided for affording amusement simultaneously with the dispensing of the gum ball or the like.

An object of the present invention resides in the provision of a dispensing machine wherein coin operated means are provided for effecting dispensing of a single gum ball or the like for a single coin.

A further object of the present invention resides in the provision of means operable upon dispensing of a single gum ball or a predetermined quantity of articles whereby a disk having simulated animals or other objects attached thereto can be rotated for movement relative to the dispensing machine to provide amusement.

Still another object of the present invention resides in the provision of a disk disposed below the gum ball retaining receptacle, the disk having a plurality of simulated animals or other objects fixedly secured thereto and in upstanding relation for movement about the exterior of the gum ball receptacle, the disk being rotated upon dispensing of the gum ball.

Various other objects and advantages will become apparent from the detailed description to follow. The best form in which we have contemplated applying our invention is clearly illustrated in the accompanying drawings, wherein:

Figure 5 is a vertical sectional view taken substantially on the plane of line 5—5 of Figure 2;

Figure 8 is a detail elevational view of the means for effecting rotation of the rotatable disk;

Figure 10 is a detail perspective view of the coin operated means.

Figure 1:
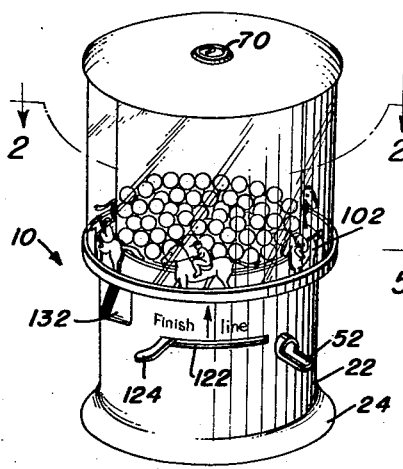
Figure 1 is a perspective view of the entire dispensing machine of the present invention.

Referring more particularly to the drawings, wherein like numerals designate like parts throughout, the numeral 10 designates generally the dispensing machine of the present invention. The dispensing machine 10 is comprised of a gum ball receptacle 12, amusement means 14, means for operating the amusement means 14 designated by the numeral 16, gum ball dispensing means 18 and coin operated means 20.

Looking now at Figure 5, the housing for the dispensing machine 10 will be seen to comprise the substantially cylindrical base 22 having a supporting flange 24 and a bearing plate 26 secured to its upper end. Intermediate the ends of the cylindrical base 22 is provided a first plate 28 which defines a compartment 30 with a lower compartment 32. Secured to the plate 28 and extending downwardly therefrom is the lug 34 which is disposed off center. The closure plate 36 is detachably connected to the lug 34 by means of the key operated means 38 which is substantially conventional in form. It will thus be seen that the plate 36 may not be removed by rotation in view of the eccentricity of the lug 34, it being necessary to operate the means 38 by means of a special key.

Figure 9:
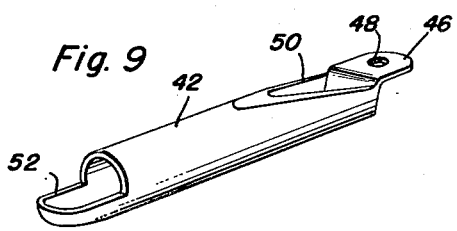
Figure 9 is a detail perspective view of the gum ball dispensing tube.

The plate 28 the gum ball dispensing aperture at 40 and a gum ball dispensing tube 42 is secured to the underside of the plate 28 by means of the screw 44. The gum ball dispensing tube 42 is best disclosed in Figure 9 as being of substantially elongated cylindrical form, one end having a flange 46 apertured at 48 for receiving the screw 44. The tube 42 is formed with an opening at 50 which is adapted to be disposed below the aperture 40 for receiving a gum ball therethrough. The other end of the tube 42 is of cup-shape at 52 and is adapted to extend through the opening 54 in the base member 22 of the dispensing machine, as seen best in Figure 1.

Figure 7:
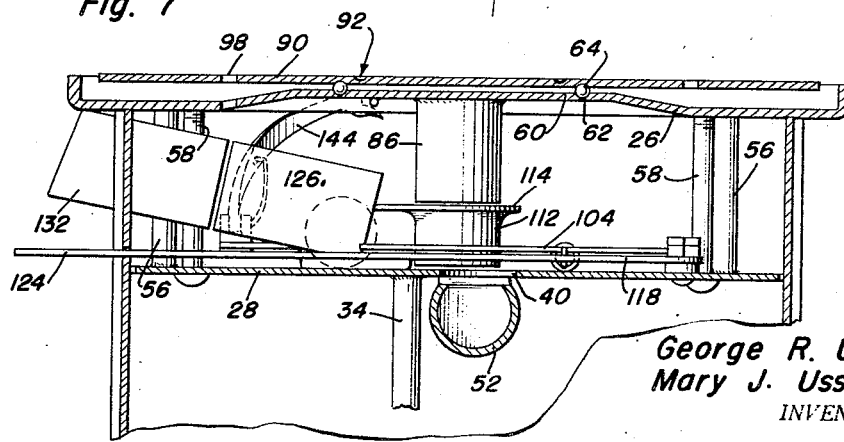
Figure 7 is a vertical sectional view taken substantially on the plane of line 7—7 of Figure 6.

Figures 5 and 7 show the plate 28 provided with a plurality of spacer lugs 56 in upstanding relation thereto for abutment against the underside of the bearing plate 26. A plurality of threaded lugs 58 are engaged through the plate 28 and threadably secured to the plate 26 for supporting the plate 28.

The plate 26 has a raised portion 60 formed with an annular groove 62 which is adapted to receive a plurality of small ball bearings 64 for a purpose to be hereinafter more fully understood.

The housing of the dispensing machine 10 further includes the provision of a cylindrical transparent member 66 upon which is seated the top cover plate 68. The top plate 68 is centrally apertured and has a key operated means 70 similar to the key operated means 38 secured therein. The threaded bore 72 of the key operated means 70 is adapted to threadably receive the elongated lug 74. The lug 74 has a substantially U-shaped element 76, 78 secured to its lower ends, the lower ends of the legs 76 and 78 being integrally secured to the bottom plate 80 of the gum ball receptacle 12.

The gum ball receptacle 12 is comprised of the base 80 and a transparent cylindrical member 82, the top closure 68 providing a cover for the gum ball receptacle 12 when threadably engaged on the lug 74. It will thus be seen that the cover 68 can be removed by inserting a key in the key operated means 70 and threadably disengaging the cover from the lug 74.

The bottom 80 of the gum ball receiving means 12 is centrally apertured and has a conduit 86 axially extending downwardly therefrom and terminating in the intermediate compartment 30.

The underside of the bottom 80 is formed with an annular groove at 88.

Figure 4:
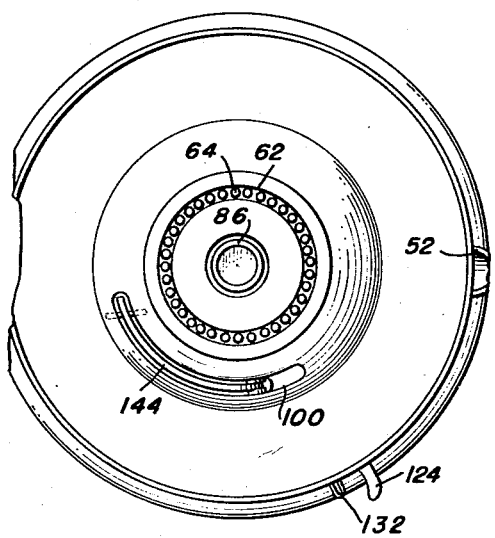
Figure 4 is a similar view but with the rotatable amusement supporting disk removed.

Intermediate the plates 26 and 80 is disposed the disk 90 which forms one element of the amusement means 14. The disk 90 is formed from its upper and lower surfaces with annular grooves 92 and 94 for cooperation with the annular grooves 88 and 62 respectively. A plurality of ball bearings 96 are disposed on the upper surface of the disk 90 in the groove 92 whereby the gum ball receptacle 12 can remain stationary while the disk 90 rotates with respect thereto. Similarly, the ball bearings 64 will rotatably support the disk 90 relative to the plate 26. The disk 90 is formed with a plurality of apertures 98 which are annularly disposed. The apertures 98 are adapted to move in a circular path for movement over the arcuate slot 100 formed in the plate 26, as seen best in Figure 4.

Figure 2:
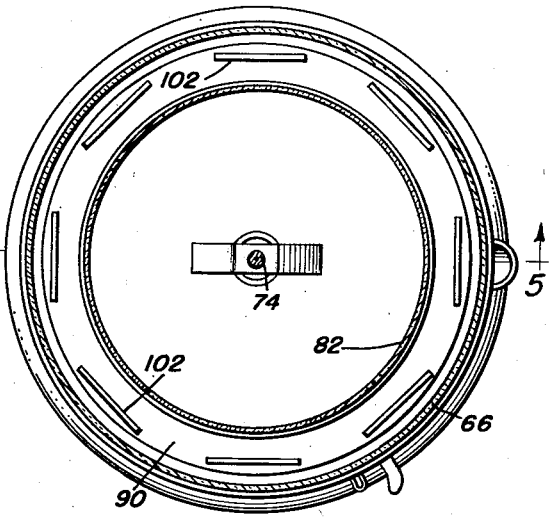
Figure 2 is a horizontal sectional view taken substantially on the plane of line 2—2 of Figure 1.
Figure 3:
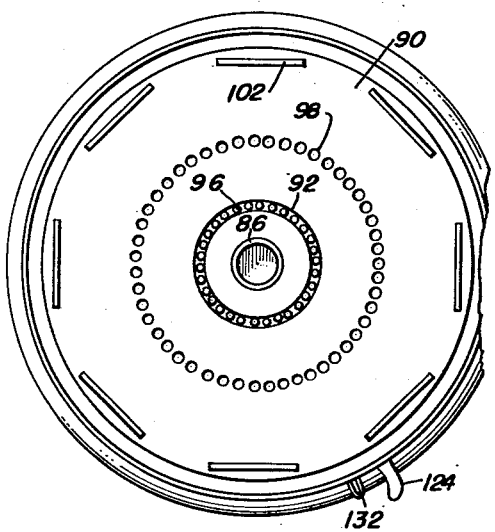
Figure 3 is a top plan view of the base with cover and gum ball receptacle removed.

Figures 2, 3 and 5 show the disk 90 as having a plurality of simulated animals 102 secured in upstanding relation thereto and for movement therewith about the gum ball receptacle 12, as seen in Figure 1.

Looking now at Figures 6, 7, 8 and 10, the dispensing means, disk operating means and coin operated means will be described. The plate 28 has a first means including a first lever 104 pivotally mounted on a pin 106. The first lever 104 has a tension spring 108 secured thereto for normally urging the same to a first position, the opposing end of the spring 108 being secured to the lug 110 on the plate 28. An intermediate portion of the first lever 104 has a tubular portion 112 vertically extending therefrom, the upper end of the tubular portion 112 having a flat plate 114 integrally secured thereto and in parallel relation to the first lever 104. When in its first position, the tubular portion 112 is adapted to be axially aligned with the conduit 86 whereby a gum ball can be dispensed from the receptacle 12 into the tubular portion 112. Figure 10 shows the first lever 104 as being formed with a slot at 116.

Second means including the second lever 118 is mounted for pivotal movement about the pin 120 secured to the plate 128 whereby the lever 118 moves about a pivotal axis displaced from that of the first lever 104. The lever 118 extends outwardly of the base 22, through the slot 122 (as seen best in Figure 1), the outer end of the second lever 118 terminating in a finger engaging portion 124.

An intermediate portion of the lever 118 has a coin receiving sleeve 126 secured thereto and in angular relation to the plane of the lever. Furthermore, the second lever 118 has a coil tension spring 128 connected thereto for normally urging the lever to the first position substantially in parallel relation to the first lever 104, the other end of the spring 128 being connected to the pin 130 secured to the plate 28.

Figure 6:
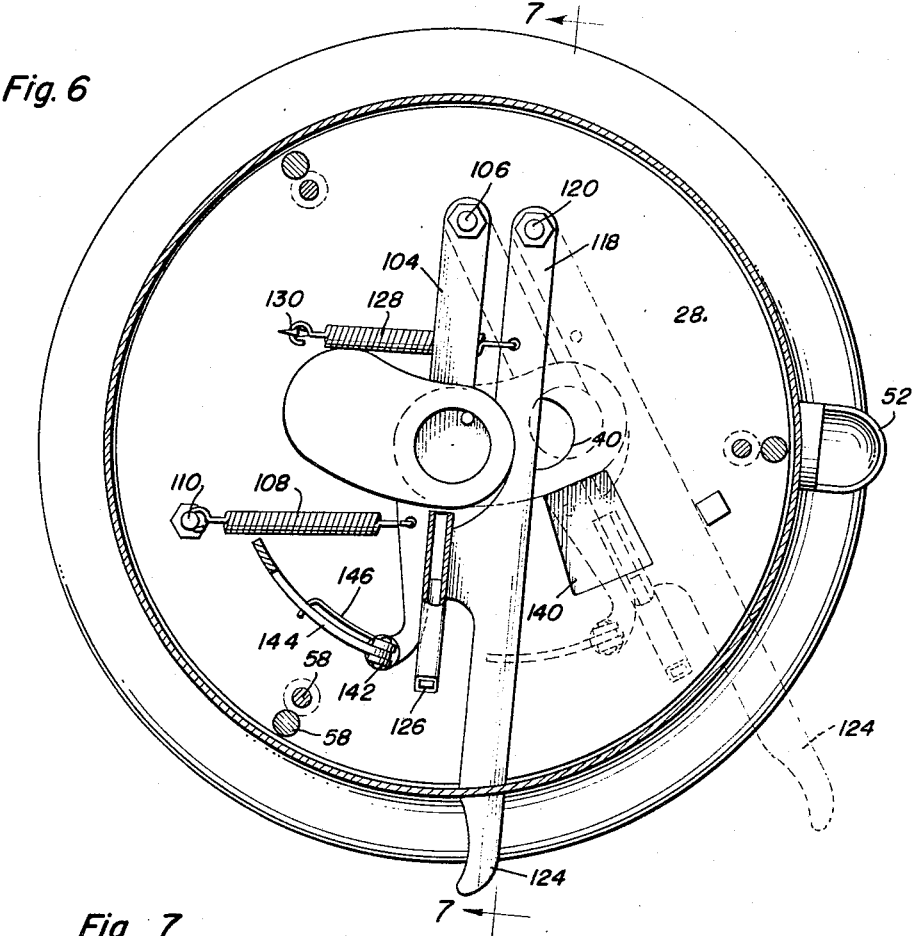
Figure 6 is a horizontal sectional view taken substantially on the plane of line 6—6 of Figure 5.

The base 22 is formed with a sleeve 132 which is adapted to be in alignment with the coin receiving sleeve 126 when in its first position whereby a coin can be inserted for movement into the coin receiving sleeve 126. It will thus be seen that the coin 134 can be inserted in the sleeve 132 for movement into the coin receiving sleeve 126 and the slot 116 of the first lever 104 whereby the two levers will be adapted to pivotally move simultaneously to the dotted line position shown in Figure 6 whereby the tubular portion 112 will be aligned with the aperture 40 for dropping a single gum ball into the dispensing tube 42. It will further be seen that when the levers move to the dotted line position shown in Figure 6, the coin will drop from inter-engagement between the levers into the coin receptacle 140. Thus, after a gum ball has been dispensed into the dispensing tube 42, the first lever 104 will be released from the second lever 118 upon depositing the coin in the coin receptacle 140, the first lever 104 returning to its first position as shown in Figure 6.

The outer end of the first lever 104 has a pair of upstanding ears 142 integrally formed therewith and pivotally supporting the finger 144. The finger 144 has a wire spring 146 engaged therein for normally urging the same upwardly into engagement with the plate 90 through the slot 100 in the plate 26. The upper end of the finger 144 is bifurcated at 148 whereby the portion 150 will be engageable in one of the openings 98 of the disk 90.

In view of the foregoing description taken in conjunction with the drawings, it is believed that one skilled in the art will readily understand the manner in which the dispensing machine operates. The coin is inserted in the sleeve 132 and is thereby engaged in the coin receiving sleeve 126 and slot 116 whereby the first and second levers 104 and 118 can be moved together about their respective pivotal axes. The second lever 118 can thereby be manually operated to the dotted line positon shown in Figure 6 whereupon the gum ball received from the conduit 86 will be dispensed from the tubular portion 112 into the opening 40 and out the dispensing tube 42. After dispensing of the gum ball, the coin will drop from the levers into the coin receptacle 140 thereby permitting the first lever 104 to return to its first position as a result of the urging of the spring 108. The finger 144 which is urged upwardly through the slot 100 will engage one of the apertures 98 in the disk 90 and as the lever 104 returns to its first position, the disk 90 will be forced to rotate. The disk 90 will freely rotate in view of the ball bearing support therefor whereby the simulated animals 102 will revolve about the gum ball receptacle 12. The disk 90 will continue to rotate and finally come to rest. The particular simulated animal finishing near the finish line, as seen best in Figure 1, will be denoted the winner. The simulated animal can be provided with colors similar to the gum balls whereby if the same color of gum ball and winning horse are simultaneously obtained, a prize can be given to the operator of the machine.

Although the machine is particularly adapted for the dispensing of a single gum ball, it will be seen that the machine can dispense predetermined quantities of various food items or the like. Furthermore, although simulated animals are shown, it is to be understood that other simulated objects such as automobiles, airplanes or the like could be employed.

Having described the invention, what is claimed as new is:

1. A combination dispensing and amusement machine comprising a hollow base having a top wall thereon, a housing supported on the top wall of said base, a dispensing receptacle supported by and disposed concentrically within said housing, and having a bottom wall spaced above and substantially parallel to said base topwall, the bottom wall of said receptacle having a dispensing conduit depending centrally therefrom through the topwall of said base, the facing surfaces of said bottom wall and said top wall having circular bearing races therein, a disk interposed between said receptacle bottom wall and said base top wall and being rotatably mounted on said conduit, and bearing elements in said races engaging opposite surfaces of said disk common means in said base closing said dispensing conduit and operatively engaging said disk for rotation, and actuating means for said common means for sequentially opening said dispensing conduit and rotating said disk.

2. A combination dispensing and amusement machine comprising a hollow base having a top wall thereon, a housing supported on the top wall of said base, a dispensing receptacle supported by and disposed concentrically within said housing, and having a bottom wall spaced above and substantially parallel to said base top wall, the bottom wall of said receptacle having a dispensing conduit depending centrally therefrom through the top wall of said base, the facing surfaces of said bottom wall and said top wall having circular bearing races therein, a disk interposed between said receptacle bottom wall and said base top wall and being rotatably mounted on said conduit, and bearing elements in said races engaging opposite surfaces of said disk common means in said base closing said dispensing conduit and operatively engaging said disk for rotation, and actuating means for said common means for sequentially opening said dispensing conduit and rotating said disk, said base including a first plate disposed beneath said top wall, said common means including a lever pivotally secured at one end to said first plate for horizontal swinging movement, a tubular sleeve intermediate the ends of said lever forming a movable extension of said dispensing conduit between said first plate and the end of said conduit.

3. A combination dispensing and amusement machine comprising a hollow base having a top wall thereon, a housing supported on the top wall of said base, a dispensing receptacle supported by and disposed concentrically within said housing, and having a bottom wall spaced above and substantially parallel to said base top wall, the bottom wall of said receptacle having a dispensing conduit depending centrally therefrom through the top wall of said base, the facing surfaces of said bottom wall and said top wall having circular bearing races therein, a disk interposed between said receptacle bottom wall and said base top wall and being rotatably mounted on said conduit, and bearing elements in said races engaging opposite surfaces of said disk common means in said base closing said dispensing conduit and operatively engaging said disk for rotation, and actuating means for said common means for sequentially opening said dispensing conduit and rotating said disk, said base including a first plate disposed beneath said top wall, said common means including a lever pivotally secured at one end to said first plate for horizontal swinging movement, a tubular sleeve intermediate the ends of said lever forming a movable extension of said dispensing conduit between said first plate and the end of said conduit, said base top wall having an arcuate slot therein, said disk having a plurality of circumferentially spaced apertures spaced inwardly from the peripheral edge thereof, a finger pivotally mounted on the free end of said lever, said finger extending through said arcuate slot and engaging one of said disk apertures.

4. In a dispensing machine, an article supporting disk having an axial article receiving tube depending therefrom, a base plate disposed beneath said disk, a rotatable disk journaled on said tube and interposed between said supporting disk and said base plate, said base plate having an article dispensing opening therein offset from the axis of said tube, an arm pivotally mounted on said base plate and having a tubular portion for receiving an article from said tube and movable from a rest position in alignment with said tube to a dispensing position in registry with said article dispensing opening, resilient means reactng to return said arm from its dispensing to its rest position, and means on said arm engaging said rotatable disk when in dispensing position and rotating said disk as the arm is returned to rest position.

References Cited in the file of this patent
UNITED STATES PATENTS

| | | |
|---|---|---|
| 432,163 | Kennedy | July 15, 1890 |
| 452,635 | Dieterich | May 19, 1891 |
| 476,384 | Imbach | June 7, 1892 |
| 538,206 | Berger | Apr. 23, 1895 |
| 763,040 | Berger | June 21, 1904 |
| 781,026 | Scharff | Jan. 31, 1905 |
| 898,995 | Simpson | Sept. 15, 1908 |
| 982,747 | Schultze | Jan. 24, 1911 |
| 1,066,753 | Rast | July 8, 1913 |
| 1,083,515 | Amsler | Jan. 6, 1914 |
| 1,128,323 | Johnstone | Feb. 16, 1915 |
| 1,397,549 | Scott | Nov. 22, 1921 |
| 1,480,560 | Lorentzen | Jan. 15, 1924 |
| 1,971,062 | Burton | Aug. 21, 1934 |
| 2,005,231 | Macourek | June 18, 1935 |
| 2,022,445 | Vogel | Nov. 26, 1935 |